United States Patent
Kim et al.

(10) Patent No.: US 11,352,563 B2
(45) Date of Patent: Jun. 7, 2022

(54) LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM USING SAME

(71) Applicant: LG CHEM, LTD., Seoul (KR)

(72) Inventors: Seongku Kim, Daejeon (KR); Jung Ho Jo, Daejeon (KR)

(73) Assignee: LG CHEM, LTD., Seoul (KR)

(*) Notice: Subject to any disclaimer, the term of this patent is extended or adjusted under 35 U.S.C. 154(b) by 303 days.

(21) Appl. No.: 16/483,713

(22) PCT Filed: Jan. 4, 2019

(86) PCT No.: PCT/KR2019/000160
§ 371 (c)(1),
(2) Date: Aug. 5, 2019

(87) PCT Pub. No.: WO2019/143053
PCT Pub. Date: Jul. 25, 2019

(65) Prior Publication Data
US 2020/0024521 A1    Jan. 23, 2020

(30) Foreign Application Priority Data
Jan. 22, 2018   (KR) .................. 10-2018-0007958

(51) Int. Cl.
| | |
|---|---|
| C08G 73/10 | (2006.01) |
| C09K 19/56 | (2006.01) |
| C08J 5/18 | (2006.01) |
| C08L 79/08 | (2006.01) |
| G02F 1/1337 | (2006.01) |

(52) U.S. Cl.
CPC .......... *C09K 19/56* (2013.01); *C08G 73/1014* (2013.01); *C08G 73/1067* (2013.01); *C08J 5/18* (2013.01); *C08L 79/08* (2013.01); *G02F 1/133723* (2013.01); *C08J 2379/08* (2013.01); *C08J 2479/08* (2013.01); *C08L 2203/16* (2013.01); *C08L 2205/025* (2013.01); *C09K 2323/027* (2020.08)

(58) Field of Classification Search
CPC .......... C08L 79/08; C08G 73/10; C09K 19/56
See application file for complete search history.

(56) References Cited

U.S. PATENT DOCUMENTS

| | | |
|---|---|---|
| 2005/0245715 A1 | 11/2005 | Wu et al. |
| 2010/0203324 A1 | 8/2010 | Iizumi |
| 2010/0297455 A1 | 11/2010 | Wu et al. |
| 2012/0273731 A1 | 11/2012 | Moralez et al. |
| 2015/0056544 A1 | 2/2015 | Miyake et al. |
| 2017/0058200 A1 | 3/2017 | Eckert et al. |

FOREIGN PATENT DOCUMENTS

| | | | |
|---|---|---|---|
| JP | 2001-296525 | A | 10/2001 |
| JP | 2012-150251 | A | 8/2012 |
| JP | 2013-508534 | A | 3/2013 |
| JP | 5292793 | B2 | 9/2013 |
| JP | 2015-040950 | A | 3/2015 |
| JP | 2015215591 | * | 12/2015 |
| JP | 2015215591 | A | 12/2015 |
| KR | 10-2012-0084253 | A | 7/2012 |
| KR | 10-1246116 | B1 | 3/2013 |
| KR | 10-2013-0038229 | A | 4/2013 |
| KR | 10-2013-0049699 | * | 5/2013 |
| KR | 10-2013-0049699 | A | 5/2013 |
| KR | 10-2014-0074117 | A | 6/2014 |
| KR | 10-2014-0098146 | A | 8/2014 |
| KR | 10-2015-0118527 | A | 10/2015 |
| KR | 10-2016-0124167 | A | 10/2016 |
| KR | 10-2017-0009327 | A | 1/2017 |
| KR | 10-2017-0030045 | A | 3/2017 |
| WO | 2008/013288 | A1 | 1/2008 |
| WO | 2013/081067 | A1 | 6/2013 |
| WO | 2017/043822 | A1 | 3/2017 |

* cited by examiner

*Primary Examiner* — Gregory Listvoyb
(74) *Attorney, Agent, or Firm* — Dentons US LLP

(57) ABSTRACT

The present invention relates to a liquid crystal aligning agent composition including a terminal modifier of a specific chemical structure together with a polyimide or a precursor polymer thereof.

8 Claims, No Drawings

LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM USING SAME

This application is a National Phase entry pursuant to 35 U.S.C. § 371 of PCT/KR2019/000160 filed on Jan. 4, 2019, and claims the benefits of filing date of Korean Patent Application No. 10-2018-0007958 filed with Korean Intellectual Property Office on Jan. 22, 2018, the entire content of which is incorporated herein by reference.

FIELD

The present invention relates to a liquid crystal aligning agent composition capable of having low discoloration even during long-term storage and thus exhibiting excellent light transmittance when applied to a liquid crystal alignment film, and also realizing improved alignment properties and electrical characteristics, a method for preparing a liquid crystal alignment film using the same, and a liquid crystal alignment film and a liquid crystal display device using the same.

BACKGROUND

In a liquid crystal display device, a liquid crystal alignment film plays a role of aligning liquid crystals in a predetermined direction. Specifically, a liquid crystal alignment film acts as a director for the arrangement of liquid crystal molecules, and thus, when the liquid crystals move due to an electric field to form an image, it allows the liquid crystals to align in an appropriate direction. In general, in order to obtain uniform brightness and a high contrast ratio in a liquid crystal display device, it is essential to uniformly align liquid crystals.

As one of the conventional methods of aligning liquid crystals, a rubbing method of coating a polymer film such as a polyimide onto a substrate such as glass or the like and rubbing a surface thereof using fibers such as nylon or polyester in a predetermined direction has been used. However, the rubbing method may cause serious problems during a manufacturing process of the liquid crystal panel because fine dust or electrostatic discharge (ESD) occurs when the fiber and polymer film are rubbed.

In order to solve the problems of the rubbing method, a photo-alignment method for inducing anisotropy in a polymer film by light irradiation rather than by rubbing, and aligning liquid crystals using anisotropy, have been studied recently.

As materials that can be used for the photo-alignment method, various materials have been introduced, among which a polyimide is mainly used for various superior performance factors of a liquid crystal alignment film. However, the polyimide is usually poor in solubility in a solvent, so it is difficult to apply directly in a manufacturing process of coating in a solution state to form an alignment film.

Accordingly, after coating in the form of a precursor such as a polyamic acid or a polyamic acid ester having excellent solubility, a heat treatment process is performed at a temperature of 200° C. to 230° C. to form a polyimide, which is then subjected to light irradiation to perform alignment treatment.

However, recently, as the performance requirements of sliquid crystal display devices has increased, and low power consumption display has been demanded, high electrical reliability, high light transmittance, and high storage stability in a high temperature environment have been regarded as important.

Thus, there is a need to develop a liquid crystal aligning agent composition capable of having low discoloration even during long-term storage and thus exhibiting excellent light transmittance when applied to a liquid crystal alignment film, and also realizing improved alignment properties and electrical characteristics

SUMMARY

It is an object of the present invention to provide a liquid crystal aligning agent composition capable of having low discoloration, even during long-term storage, and thus exhibiting excellent light transmittance when applied to a liquid crystal alignment film, and also realizing improved alignment properties and electrical characteristics.

It is another object of the present invention to provide a method for preparing a liquid crystal alignment film using the aforementioned liquid crystal aligning agent composition.

It is a further object of the present invention to provide a liquid crystal alignment film prepared by the aforementioned preparation method, and a liquid crystal display device including the same.

In order to achieve the above objects, the present invention provides a liquid crystal aligning agent composition including: a polymer which includes one or more selected from the group consisting of a polyamic acid repeating unit, a polyamic acid ester repeating unit, and a polyimide repeating unit, and has a primary amino group bonded to at least one terminal; and a terminal modifier compound represented by the following Chemical Formula 1.

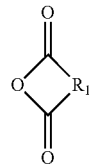

[Chemical Formula 1]

In Chemical Formula 1, $R_1$ is any one of a linear organic functional group represented by the following Chemical Formula 2 or a cyclic organic functional group represented by the following Chemical Formula 3.

[Chemical Formula 2]

In Chemical Formula 2, $R_2$ is any one of —O—, —CO—, —S—, —CONH—, —COO—, —O(CH$_2$)$_z$O—, —OCO—(CH$_2$)$_z$—OCO—, a substituted or unsubstituted alkylene group having 1 to 20 carbon atoms, and a substituted or unsubstituted alkenylene group having 2 to 20 carbon atoms, and Z is an integer of 1 to 10.

[Chemical Formula 3]

In Chemical Formula 3, $C_1$ is any one of a substituted or unsubstituted cycloalkylene group having 3 to 20 carbon atoms, a substituted or unsubstituted arylene group having 6 to 20 carbon atoms, a substituted or unsubstituted heteroarylene group having 4 to 20 carbon atoms, and a substituted or unsubstituted cycloalkenylene group having 3 to 20 carbon atoms.

The present invention also includes a method for preparing a liquid crystal alignment film including the steps of: coating the liquid crystal aligning agent composition onto a substrate to form a coating film; drying the coating film; irradiating the dried coating film with light or rubbing the coating film to perform alignment treatment; and heat-treating and curing the alignment-treated coating film.

In addition, the present invention provides a liquid crystal alignment film prepared by the aforementioned preparation method, and a liquid crystal display device including the same.

DETAILED DESCRIPTION

Hereinafter, a liquid crystal aligning agent composition, a method for preparing a liquid crystal alignment film using the same, and a liquid crystal alignment film using the same, according to specific embodiments of the present invention will be described in more detail.

I. Liquid Crystal Aligning Agent Composition

According to one embodiment of the invention, a liquid crystal aligning agent composition can be provided, including: a polymer containing at least one selected from the group consisting of a polyamic acid repeating unit, a polyamic acid ester repeating unit, and a polyimide repeating unit; and a terminal modifier compound represented by Chemical Formula 1.

The present inventors found through experiments that, as in the liquid crystal aligning agent composition of one embodiment, as a terminal modifier compound which is added together with a polymer containing one or more selected from the group consisting of a polyamic acid repeating unit, a polyamic acid ester repeating unit, and a polyimide repeating unit has a monoanhydride structure as shown in Chemical Formula 1, it may react with a primary amino group present at the terminal end of the main chain contained in the polymer to replace the main chain end with the monocarboxylic acid, and consequently, the liquid crystal alignment film obtained from the liquid crystal aligning agent composition can have higher light transmittance than before the addition of the terminal modifier compound, and a liquid crystal cell provided with the liquid crystal alignment film can realize improved electrical reliability and alignment properties, thereby embodying certain aspects of the present invention.

As described above, since the primary amino group at the terminal end of the main chain of the polymer is substituted with the functional group of Chemical Formula 9 (described later), or the like, by the terminal modifier compound contained in the liquid crystal aligning agent composition, it is possible to prevent the oxidation of the terminal amino group and thus have high light transmittance in the liquid crystal alignment layer. Further, it is possible to realize improved electrical reliability and alignment properties in a liquid crystal cell provided with a liquid crystal alignment film.

In particular, due to the chemical structural features in which the terminal modifier compound may include a linear organic functional group represented by Chemical Formula 2 or a cyclic organic functional group represented by Chemical Formula 3 described below, and more preferably, it includes a divalent organic functional group derived from benzofuran, the liquid crystal alignment film can have high light transmittance, and a liquid crystal cell provided with the liquid crystal alignment film can realize improved electrical reliability and alignment properties.

Hereinafter, the present invention will be described in more detail.

Unless specified otherwise herein, the following terms can be defined as follows.

Throughout the specification, when one part "includes" one constituent element, unless otherwise specifically described, this does not mean that another constituent element is excluded, but means that another constituent element may be further included.

In the present specification, examples of the substituents are described below, but are not limited thereto.

As used herein, the term "substituted" means that other functional groups instead of a hydrogen atom in the compound are bonded, and a position to be substituted is not limited as long as the position is one at which the hydrogen atom is substituted, that is, a position at which the substituent can be substituted, and when two or more are substituted, the two or more substituents may be the same as or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkoxysilylalkyl group; an arylphosphine group; or a heteroaryl group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked.

As used herein, the notation

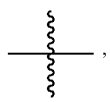

or ⸺⸻⸻* means a bond linked to another substituent group, and the direct bond means the case where no other atoms exist in the parts represented as $L_1$.

In the present specification, the alkyl group is a monovalent functional group derived from an alkane, and may be a straight-chain or a branched-chain. The number of carbon atoms of the straight chain alkyl group is not particularly limited, but is preferably 1 to 20. Also, the number of carbon atoms of the branched chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethylpropyl, isohexyl, 2-methylpentyl, 4-methylhexyl, 5-methylhexyl, 2,6-dimethylheptane-4-yl, and the like, but are not limited thereto.

In the present specification, the cycloalkyl group is a monovalent functional group derived from a cycloalkane, which may be monocyclic or polycyclic, and is not particularly limited, but the number of carbon atoms thereof is 3 to 20. According to another embodiment, the cycloalkyl group has 3 to 10 carbon atoms. Specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, bicyclo[2,2,1]heptyl, and the like, but are not limited thereto.

In the present specification, the aryl group is a monovalent functional group derived from an arene, and is not particularly limited but preferably has 6 to 20 carbon atoms, and may be a monocyclic aryl group or a polycyclic aryl group. The monocyclic aryl group may include, but not limited to, a phenyl group, a biphenyl group, a terphenyl group, or the like. The polycyclic aryl group may include, but is not limited to, a naphthyl group, an anthracenyl group, a phenanthryl group, a pyrenyl group, a perylenyl group, a chrycenyl group, a fluorenyl group, or the like.

In the present specification, a heteroaryl group includes one or more atoms other than carbon, that is, one or more heteroatoms, and specifically, each heteroatom may include one or more atoms selected from the group consisting of O, N, Se, S, and the like. The number of carbon atoms thereof is not particularly limited, but is preferably 2 to 30, and the heteroaryl group may be monocyclic or polycyclic. Examples of a heterocyclic group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a qinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), an isoxazolyl group, a thiadiazolyl group, a benzothiazolyl group, a phenothiazinyl group, an aziridyl group, an azaindolyl group, an isoindolyl group, an indazolyl group, a purine group (purine), a pteridyl group (pteridine), a beta-carboline group, a naphthyridyl group (naphthyridine), a terpyridyl group, a phenazinyl group, an imidazopyridyl group, a pyropyridyl group, an azepine group, a pyrazolyl group, a dibenzofuranyl group, and the like, but are not limited thereto.

In the present specification, the alkoxy group may be straight-chained, branched, or cyclic. The number of carbon atoms of the alkoxy group is not particularly limited, but is preferably 1 to 30. Specific examples thereof include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but are not limited thereto.

In the present specification, the alkenyl group is a monovalent functional group derived from an alkene, which may be straight-chained or branched, and the number of carbon atoms thereof is not particularly limited, but is preferably 2 to 20. According to another embodiment, the alkenyl group has 2 to 10 carbon atoms. According to a further embodiment, the alkenyl group has 2 to 6 carbon atoms. Specific examples thereof include vinyl, 1-propenyl, isopropenyl, 1-butenyl, 2-butenyl, 3-butenyl, 1-pentenyl, 2-pentenyl, 3-pentenyl, 3-methyl-l-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, the silyl group is a monovalent functional group derived from a silane, and for example, it may have a structure in which three alkyl groups or aryl groups are bonded to a silicon atom. The details of the alkyl group or the aryl group are as described above. Specific examples of the silyl group include a trimethylsilyl group, a triethylsilyl group, a triisopropylsilyl group, a t-butyldimethylsilyl group, a vinyldimethylsilyl group, a propyldimethylsilyl group, a triphenylsilyl group, a diphenylsilyl group, a phenylsilyl group, and the like, but are not limited thereto.

In the present specification, the alkylene group is a bivalent functional group derived from an alkane, and the description of the alkyl group as defined above may be applied except that the alkylene is a divalent functional group. For example, the alkylene group is a straight chain or a branched chain, and may include a methylene group, an ethylene group, a propylene group, an isobutylene group, a sec-butylene group, a tert-butylene group, a pentylene group, a hexylene group, or the like.

In the present specification, the alkenylene group is a divalent functional group derived from an alkene, and the description of the alkenyl group as defined above can be applied, except that they are bivalent functional groups. For example, the alkenylene group is a straight chain or a branched chain, and may be:

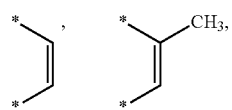

and the like.

In the present specification, the cycloalkenylene group is a divalent functional group derived from a cycloalkene, and the description of the alkenyl group as defined above can be applied, except that they are cyclic functional groups. For example, the cycloalkenylene group may be:

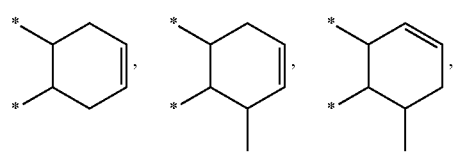

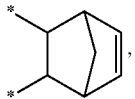

and the like.

In the present specification, the arylene group is a bivalent functional group derived from an arene, and the description of the aryl group as defined above may be applied except that they are divalent functional groups. For example, the arylene group is a straight chain or a branched chain, and may be a phenylene group, a biphenylene group, a terphenylene group, and the like.

In the present specification, the heteroarylene group can be applied to the description of the heteroaryl group as defined above, except that the heteroarylene is a divalent functional group. Examples thereof may be:

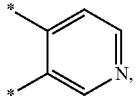 [SMILES: *c1ccncc1*]

and the like.

In the present specification, a multivalent organic group is a residue in which a plurality of hydrogen atoms bonding to an arbitrary compound are removed, and for example, it may be a divalent organic group, a trivalent organic group, and a tetravalent organic group. As an example, a tetravalent organic group derived from cyclobutane means a residue in which any four hydrogen atoms bonded to cyclobutane are removed.

As used herein, a direct bond or a single bond means being connected to a bond line where no atoms or atomic groups exist at the corresponding position. Specifically, it means the case where no other atoms exist in the parts represented as $L_1$ in the chemical formula.

(1) Polymer

The polymer may include one or more selected from the group consisting of a polyamic acid repeating unit, a polyamic acid ester repeating unit, and a polyimide repeating unit. That is, the polymer may include a copolymer in which one kind of polyamic acid repeating unit, one kind of polyamic acid ester repeating unit, one kind of polyimide repeating unit, or two or more kinds of repeating units thereof, are mixed.

The one or more repeating units selected from the group consisting of a polyamic acid repeating unit, a polyamic acid ester repeating unit, and a polyimide repeating unit may form the main chain of the polymer.

Specifically, the polyimide repeating unit may include a repeating unit represented by the following Chemical Formula 4, the polyamic acid ester repeating unit may include a repeating unit represented by the following Chemical Formula 5, and the polyamic acid repeating unit may include a repeating unit represented by the following Chemical Formula 6.

[Chemical Formula 4]

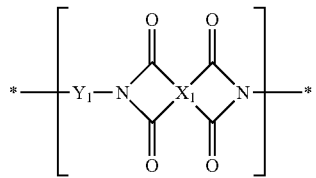

[Chemical Formula 5]

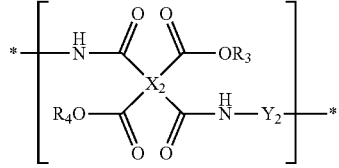

[Chemical Formula 6]

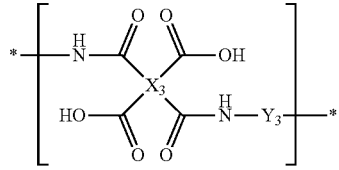

In Chemical Formulas 4 to 6, $X_1$ to $X_3$ are the same as or different from each other, and are each independently a tetravalent organic group. The $X_1$ to $X_3$ may each be a functional group derived from a tetracarboxylic acid dianhydride compound used in the synthesis of polyamic acid, polyamic acid ester, or polyimide.

More specifically, the $X_1$ to $X_3$ may each independently be any one of the tetravalent organic groups represented by the following Chemical Formula 8.

[Chemical Formula 8]

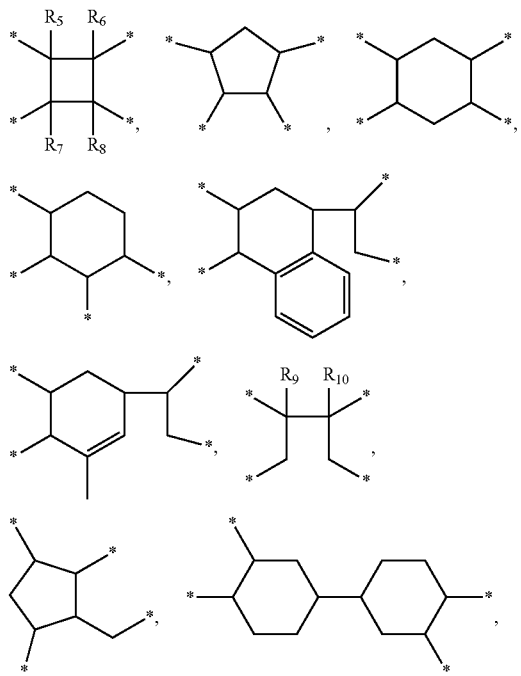

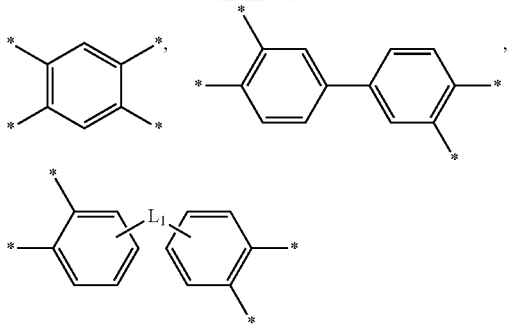

In Chemical Formula 8, $R_5$ to $R_{10}$ are each independently hydrogen, or an alkyl group having 1 to 6 carbon atoms. $L_1$ is any one selected from the group consisting of a single bond, —O—, —CO—, —COO—, —S—, —SO—, —SO$_2$—, —CR$_{11}$R$_{12}$—, —(CH$_2$)$_t$—, —O(CH$_2$)$_t$O—, —COO(CH$_2$)$_t$OCO—, —CONH—, phenylene, or a combination thereof, the $R_{11}$ and $R_{12}$ are each independently hydrogen, or an alkyl group or haloalkyl group having 1 to 10 carbon atoms, and t is an integer of 1 to 10.

More preferably, the $X_1$ to $X_3$ may each independently be an organic group of the following Chemical Formula 8-1 derived from 3,3',4,4'-biphenyl tetracarboxylic acid dianhydride.

[Chemical Formula 8-1]

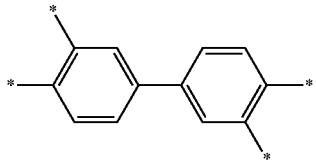

On the other hand, in Chemical Formulas 4 to 6, $Y_1$ to $Y_3$ are the same as or different from each other, and are each independently a divalent organic group. The $Y_1$ to $Y_3$ may each be a functional group derived from a diamine compound used in the synthesis of polyamic acid, polyamic acid ester, and polyimide.

As a specific example, the $Y_1$ to $Y_3$ may be a divalent organic group represented by the following Chemical Formula 7.

[Chemical Formula 7]

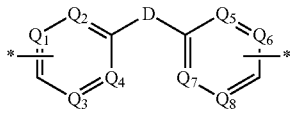

In Chemical Formula 7, at least one of $Q_1$ to $Q_8$ is nitrogen and the rest are carbon, D is —NR'— or —O—, and R' is hydrogen or an alkyl group having 1 to 6 carbon atoms.

In the organic group represented by Chemical Formula 7, wherein at least one of $Q_1$ to $Q_4$ is nitrogen and the rest are carbon, $Q_5$ to $Q_8$ are carbon, and D may be —NR'—. More preferably, in Chemical Formula 7, $Q_2$ of $Q_1$ to $Q_4$ is nitrogen and the rest are carbon, $Q_5$ to $Q_8$ are carbon, and D is —NH—.

[Chemical Formula 7-1]

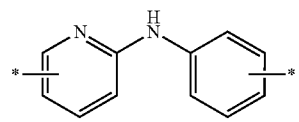

More specifically, Chemical Formula 7-1 may include functional groups represented by the following Chemical Formulas 7-a to 7-c.

[Chemical Formula 7-a]

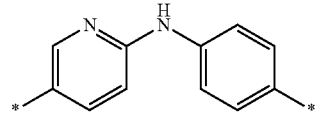

[Chemical Formula 7-b]

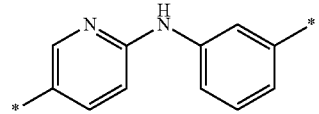

[Chemical Formula 7-c]

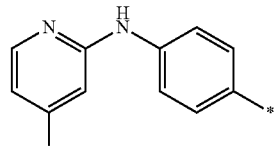

As such, by including the functional group represented by Chemical Formula 7, the liquid crystal display device to which the polymer for the liquid crystal aligning agent of one embodiment is applied can realize a high voltage holding ratio and liquid crystal alignment property.

Further, in Chemical Formulas 4 to 6, at least one of $R_3$ and $R_4$ may be an alkyl having 1 to 10 carbon atoms, and the rest may be hydrogen.

On the other hand, the polymer may have a structure in which a primary amino group is bonded to at least one terminal. That is, the polymer contains the repeating units represented by Chemical Formulas 4 to 6 as a main chain, and may be present in a state in which a primary amino group (—NH$_2$) is bonded to any one of the terminal ends of the main chain.

A primary amino group (—NH$_2$) may be bonded to at least one of two terminal ends of the main chain.

Examples of the method of bonding the primary amino group to at least one terminal end of the polymer are not particularly limited, and for example, among the diamine compound and the tetracarboxylic acid anhydride compound, which are reaction monomers used in the production of the polymer, a method in which the molar content of the diamine compound is added in excess of the molar content of the tetracarboxylic anhydride compound can be used.

On the other hand, the polymer may further include a second polymer which includes one or more selected from the group consisting of a polyamic acid repeating unit, a polyamic acid ester repeating unit, and a polyimide repeating unit, and has a structure in which a primary amino group is bonded to at least one terminal, the primary amino group being substituted with a functional group represented by the following Chemical Formula 9.

[Chemical Formula 9]

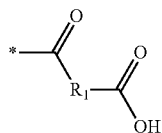

In Chemical Formula 9, $R_1$ is as defined in Chemical Formula 1.

Specifically, it is considered that the second polymer includes one or more selected from the group consisting of a polyamic acid repeating unit, a polyamic acid ester repeating unit, and a polyimide repeating unit contained in the liquid crystal aligning agent composition of one embodiment, which corresponds to the reaction product in which the terminal modifier compound represented by Chemical Formula 1 reacts with a polymer in which a primary amino group is bonded to at least one terminal, and thus the terminal primary amino group is modified.

That is, among two hydrogen atoms contained in the primary amino group bonded to at least one terminal end of the polymer, one or more hydrogen atoms may be substituted with the functional group represented by Chemical Formula 9.

Accordingly, the second polymer may include one or more repeating units selected from the group consisting of the following Chemical Formulas 10, 11, and 12.

[Chemical Formula 10]

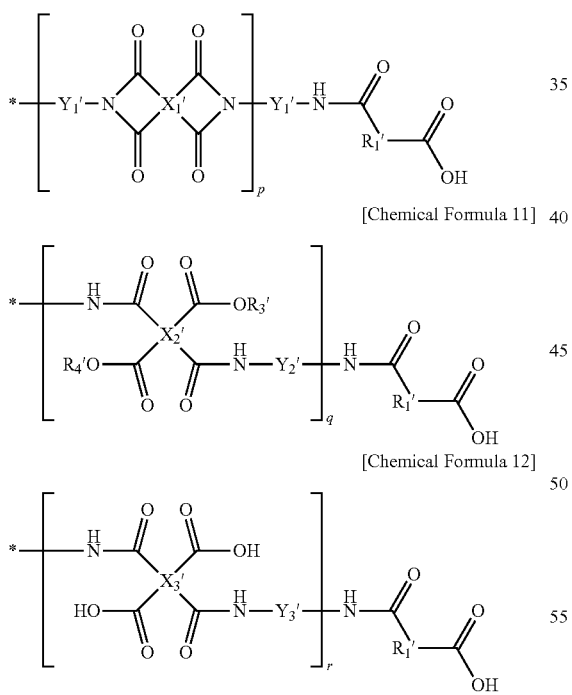

[Chemical Formula 11]

[Chemical Formula 12]

In Chemical Formulas 10 to 12, $R_1'$ may either be a linear organic functional group represented by Chemical Formula 2 or a cyclic organic functional group represented by Chemical Formula 3.

Further, in Chemical Formulas 10 to 12, p, q, and r are each independently an integer of 1 to 50,000.

In addition, in Chemical Formulas 10 to 12, $X_1'$ to $X_3'$ are the same as or different from each other, and are each independently a tetravalent organic group. The $X_1'$ to $X_3'$ may each be a functional group derived from a tetracarboxylic dianhydride compound used in the synthesis of polyamic acid, polyamic acid ester, or polyimide.

More specifically, the $X_1'$ to $X_3'$ may each independently be any one of the tetravalent organic groups represented by Chemical Formula 8.

Further, in Chemical Formulas 10 to 12, $Y_1'$ to $Y_3'$ are the same as or different from each other, and are each independently a divalent organic group. The $Y_1'$ to $Y_3'$ may each be a functional group derived from a diamine compound used in the synthesis of polyamic acid, polyamic acid ester, or polyimide. As a specific example, the $Y_1'$ to $Y_3'$ may be a divalent organic group represented by Chemical Formula 7.

Also, in Chemical Formulas 10 to 12, at least one of $R_3'$ and $R_4'$ may be an alkyl having 1 to 10 carbon atoms, and the rest may be hydrogen.

The second polymer may further include one or more repeating units selected from the group consisting of the following Chemical Formulas 13, 14, and 15. The one or more repeating units selected from the group consisting of the following Chemical Formulas 13, 14, and 15 may form a main chain of the second polymer.

[Chemical Formula 13]

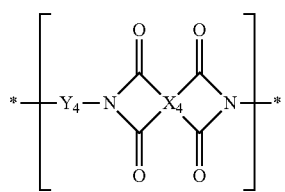

[Chemical Formula 14]

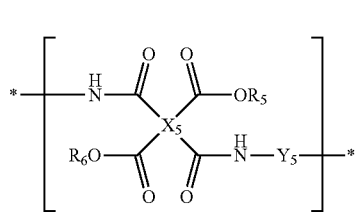

[Chemical Formula 15]

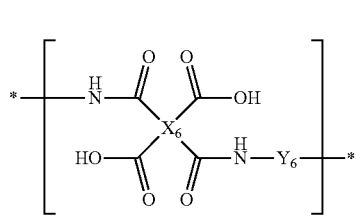

In Chemical Formulas 13 to 15, at least one of $R_5$ and $R_6$ is an alkyl having 1 to 10 carbon atoms and the rest are hydrogen, $X_4$ to $X_6$ are the same as or different from each other and are each independently a tetravalent organic group, and $Y_4$ to $Y_6$ are the same as or different from each other and are each independently a divalent organic group represented by Chemical Formula 7.

More specifically, the $X_4$ to $X_6$ may each independently be any one of the tetravalent organic groups represented by Chemical Formula 8.

The second polymer may be present in an amount of 0.5% to 40% by weight, based on the total liquid crystal aligning agent composition. That is, in the liquid crystal aligning agent composition, a second polymer in which a functional group represented by Chemical Formula 9 is bonded to at least one terminal is mixed, together with a first polymer in which a primary amino group is bonded to at least one terminal, and a terminal modifying agent.

If the second polymer is excessively reduced to less than 0.5% by weight, relative to the total liquid crystal aligning agent composition, the extent of modification of the polymer terminal is insignificant, and it is difficult to sufficiently realize improvement in light transmittance and electrical characteristics of the liquid crystal aligning agent composition. Also, if the second polymer is excessively increased to more than 40% by weight, relative to the total liquid crystal aligning agent composition, there is a limitation in that the number of repeating units of the molecule is decreased and the alignment property and the electrical characteristics inherent to the polymer are lowered.

(2) Terminal Modifier Compound

The liquid crystal aligning agent composition of one embodiment may include a terminal modifier compound, in addition to the polymer described above. The terminal modifier compound may have a specific chemical structure represented by Chemical Formula 1. The physical/chemical properties of the terminal modifier compound are considered to be due to the specific structure of Chemical Formula 1 described above.

Specifically, in the case of the cyclic monodicarboxylic acid anhydride structure as shown in Chemical Formula 1, it has high reactivity with the primary amino group present at the polymer terminal end, and the hydrogen atom bonded to the primary amino group can be easily substituted with the functional group of Chemical Formula 9 described below.

Consequently, the polymer in which the primary amino group is bonded to the terminal exhibits completely different physical and chemical properties while the chemical structure of the terminal end is changed to the functional group of Chemical Formula 9. These changed physical and chemical properties are suitable for realizing high electrical reliability and high light transmittance in a high temperature environment.

Specifically, in Chemical Formula 1, $R_1$ may be any one of the linear organic functional groups represented by Chemical Formula 2 or the cyclic organic functional groups represented by Chemical Formula 3.

In the linear organic functional groups represented by Chemical Formula 2, $R_2$ is any one of —O—, —CO—, —S—, —CONH—, —COO—, —O(CH$_2$)$_z$O—, —OCO—(CH$_2$)$_z$—OCO—, a substituted or unsubstituted alkylene group having 1 to 20 carbon atoms, or a substituted or unsubstituted alkenylene group having 2 to 20 carbon atoms, and Z is an integer of 1 to 10.

More specifically, in $R_2$ of Chemical Formula 2, the substituted or unsubstituted alkylene group having 1 to 20 carbon atoms may include i) an unsubstituted or substituted alkylene group having 1 to 10 carbon atoms, or ii) an alkylene group having 1 to 20 carbon atoms substituted with one or more substituents selected from the group consisting of a halogen, an alkyl group having 1 to 20 carbon atoms, and an alkoxysilylalkyl group having 1 to 20 carbon atoms.

Further, in $R_2$ of Chemical Formula 2, the substituted or unsubstituted alkenylene group having 2 to 20 carbon atoms may include i) an unsubstituted alkenylene group having 2 to 10 carbon atoms, or ii) an alkenylene group having 2 to 10 carbon atoms substituted with an alkyl group having 1 to 20 carbon atoms.

Specific examples of the linear organic functional group represented by Chemical Formula 2 include any one of the functional groups represented by the following Chemical Formula 2-1.

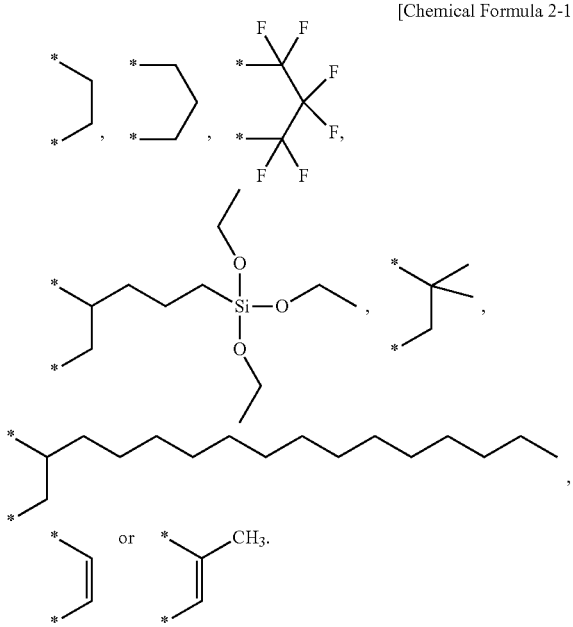

[Chemical Formula 2-1]

On the other hand, in the cyclic organic functional group represented by Chemical Formula 3, $C_1$ is any one of a substituted or unsubstituted cycloalkylene group having 3 to 20 carbon atoms, a substituted or unsubstituted arylene group having 6 to 20 carbon atoms, a substituted or unsubstituted heteroarylene group having 4 to 20 carbon atoms, or a substituted or unsubstituted cycloalkenylene group having 3 to 20 carbon atoms.

Specifically, in $C_1$ of Chemical Formula 3, the substituted or unsubstituted cycloalkylene group having 3 to 20 carbon atoms may include i) an unsubstituted cycloalkylene group having 3 to 10 carbon atoms, or ii) a cycloalkylene group having 3 to 10 carbon atoms substituted with an alkyl group having 1 to 20 carbon atoms.

Further, in $C_1$ of Chemical Formula 3, the substituted or unsubstituted arylene group having 6 to 20 carbon atoms may include i) an unsubstituted arylene group having 6 to 10 carbon atoms, or ii) an arylene group having 6 to 10 carbon atoms substituted with a halogen.

Further, in $C_1$ of Chemical Formula 3, the substituted or unsubstituted heteroarylene group having 4 to 20 carbon atoms may include an unsubstituted heteroarylene group having 4 to 10 carbon atoms.

Further, in $C_1$ of Chemical Formula 3, the substituted or unsubstituted cycloalkenylene group having 3 to 20 carbon atoms may include i) an unsubstituted cycloalkenylene group having 3 to 10 carbon atoms, or ii) a cycloalkenylene group having 3 to 10 carbon atoms substituted with an alkyl group having 1 to 20 carbon atoms.

Specific examples of the cyclic organic functional group represented by Chemical Formula 3 may include one of the functional groups represented by the following Chemical Formula 3-1.

[Chemical Formula 3-1]

-continued

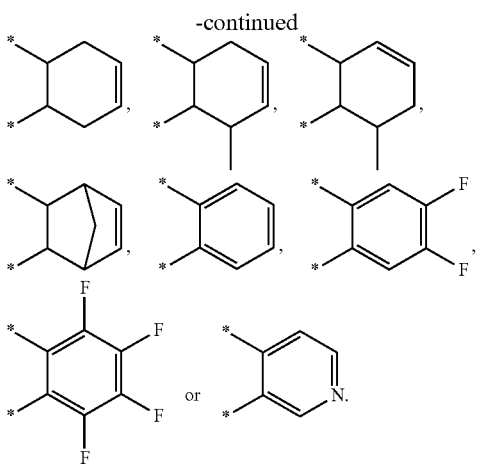

More preferably, the terminal modifier compound represented by Chemical Formula 1 may include a compound represented by the following Chemical Formula 1-1 to a compound represented by the following Chemical Formula 1-4.

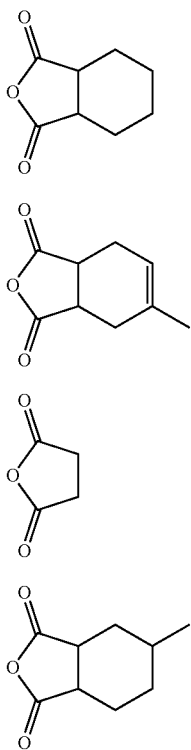

[Chemical Formula 1-1]

[Chemical Formula 1-2]

[Chemical Formula 1-3]

[Chemical Formula 1-4]

The terminal modifier compound represented by Chemical Formula 1 may be contained in an amount of 0.1% to 20% by weight, based on the total weight of the liquid crystal aligning agent composition. When the content of the terminal modifier compound is excessively large, there is a limitation in that the number of repeating units of the molecule is decreased and the alignment property and the electrical characteristic inherent to the polymer are lowered.

On the other hand, if the content of the terminal modifier compound is too small, it may be difficult to sufficiently realize the effect of improving the light transmittance and electrical characteristics by modification of the terminal primary amino group of the polymer for a liquid crystal aligning agent.

II. Method of Preparing Liquid Crystal Alignment Film

In addition, the present invention provides a method for preparing a liquid crystal alignment film, including: a step of coating the liquid crystal aligning agent composition onto a substrate to form a coating film (step 1); a step of drying the coating film (step 2); a step of irradiating the dried coating film with light or rubbing the coating film to perform an alignment treatment (step 3); and a step of heat-treating and curing the alignment-treated coating film (step 4).

Step 1 is a step of coating the liquid crystal aligning agent composition onto a substrate to form a coating film. The details of the liquid crystal aligning agent composition include those described above, in one embodiment.

The method of coating the liquid crystal aligning agent composition onto a substrate is not particularly limited, and for example, a method such as screen printing, offset printing, flexographic printing, inkjet printing, and the like can be used.

Further, the liquid crystal aligning agent composition may be dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. They can be used alone or in combination of two or more.

In addition, the liquid crystal aligning agent composition may further include other components in addition to the organic solvent. In a non-limiting example, when the liquid crystal aligning agent composition is coated, additives capable of improving the uniformity of the thickness of a film and the surface smoothness, improving the adhesion between a liquid crystal alignment film and a substrate, changing the dielectric constant and conductivity of a liquid crystal alignment film, or increasing the density of a liquid crystal alignment film, may be further included. Examples of these additives include various kinds of solvents, surfactants, silane-based compounds, dielectrics, crosslinking compounds, etc.

Step 2 is a step of drying the coating film formed by coating the liquid crystal aligning agent composition onto a substrate.

The step of drying the coating film may be performed by a heating means such as a hot plate, a hot air circulating oven, an infrared oven, and the like, and the drying may be performed at a temperature of 50° C. to 150° C., or 50° C. to 100° C.

Step 3 is a step of irradiating the dried coating film with light or rubbing the coating film to perform alignment treatment.

In the alignment treatment step, the light irradiation may be performed by irradiating polarized ultraviolet rays having a wavelength of 150 nm to 450 nm. In this case, the intensity of the light exposure may vary depending on the kind of the polymer for a liquid crystal aligning agent, and energy of 10 mJ/cm$^2$ to 10 J/cm$^2$, preferably energy of 30 mJ/cm$^2$ to 2 J/cm$^2$, may be irradiated.

As for the ultraviolet rays, the polarized ultraviolet rays selected among the ultraviolet rays subjected to polarization treatment by a method of passing through or reflecting by a polarizing device using a substrate in which a dielectric anisotropic material is coated onto the surface of a transparent substrate such as quartz glass, soda lime glass, soda lime-free glass, etc., a polarizer plate on which aluminum or metal wires are finely deposited, or a Brewster's polarizing device by the reflection of quartz glass, etc., are irradiated to perform the alignment treatment. Herein, the polarized ultraviolet rays may be irradiated perpendicularly to the surface of the substrate, or may be irradiated by directing an angle of incidence toward a specific angle. By this method, the alignment capability of the liquid crystal molecules is imparted to the coating film.

Further, in the alignment treatment step, a method using a rubbing cloth may be employed. More specifically, in the rubbing treatment, the surface of the coating film after the heat treatment step can be rubbed in one direction while rotating a rubbing roller of which a rubbing cloth is attached to a metal roller.

Step 4 is a step of heat-treating and curing the alignment-treated coating film.

In this case, the heat treatment may be performed by a heating means such as a hot plate, a hot-air circulation furnace, an infrared furnace, and the like, and the heat treatment may be performed at a temperature of 180° C. to 300° C., or 200° C. to 300° C.

III. Liquid Crystal Alignment Film

The present invention may also provide a liquid crystal alignment film prepared in accordance with the method for preparing a liquid crystal alignment film described above.

Specifically, the liquid crystal alignment film may include an aligned cured product of the liquid crystal aligning agent composition of the one embodiment. The aligned cured product means a material obtained through an alignment step and a curing step of the liquid crystal aligning agent composition of the one embodiment.

As described above, when a liquid crystal aligning agent composition including: a polymer which includes one or more selected from the group consisting of a polyamic acid repeating unit, a polyamic acid ester repeating unit, and a polyimide repeating unit, and has a structure in which a primary amino group is bonded to at least one terminal; and a terminal modifier compound represented by Chemical Formula 1, is used, it is possible to prepare a liquid crystal alignment film having high light transmittance and also having excellent alignment and electrical characteristics.

The thickness of the liquid crystal alignment film is not particularly limited, but for example, it can be freely adjusted within the range of 0.01 μm to 1000 μm. If the thickness of the liquid crystal alignment film increases or decreases by a specific value, the physical properties measured in the alignment film may also change by a certain value.

IV. Liquid Crystal Display Device

In addition, the present invention provides a liquid crystal display device including the liquid crystal alignment film described above.

The liquid crystal alignment film may be introduced into a liquid crystal cell by a known method, and likewise, the liquid crystal cell may be introduced into a liquid crystal display device by a known method. The liquid crystal alignment film can be prepared from the liquid crystal aligning agent composition of the present invention, thereby achieving excellent stability together with excellent various physical properties. Consequently, the liquid crystal display device capable of exhibiting high reliability can be provided.

According to the present invention, a liquid crystal aligning agent composition capable of having low discoloration even during long-term storage and thus exhibiting excellent light transmittance when applied to a liquid crystal alignment film, and also realizing improved alignment properties and electrical characteristics, a method for preparing a liquid crystal alignment film using the same, and a liquid crystal alignment film and a liquid crystal display device using the same, can be provided.

EXAMPLES

The present invention will be described in more detail by way of examples. However, these examples are given for illustrative purposes only, and the scope of the invention is not intended to be limited to or by these examples.

Preparation Example: Preparation of Diamine

Preparation Example 1

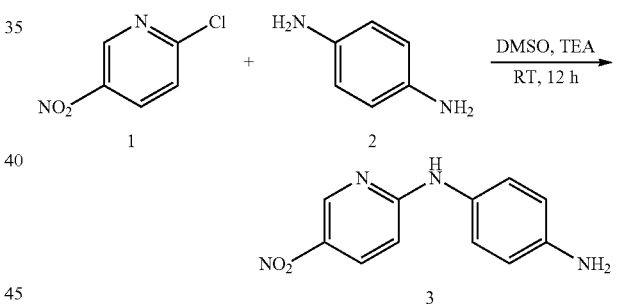

18.3 g (100 mmol) of 2-chloro-5-nitropyridine (compound 1) and 12.5 g (98.6 mmol) of paraphenylenediamine (p-PDA, compound 2) were completely dissolved in 200 mL of dimethyl sulfoxide (DMSO), and then 23.4 g (200 mmol) of triethylamine (TEA) was added thereto and stirred at room temperature for 12 hours. When the reaction was completed, the reaction mixture was added to a container containing 500 mL of water and stirred for 1 hour. A solid obtained by filtration was washed with 200 mL of water and 200 mL of ethanol to synthesize 16 g (61.3 mmol) of a compound 3 (yield: 60%).

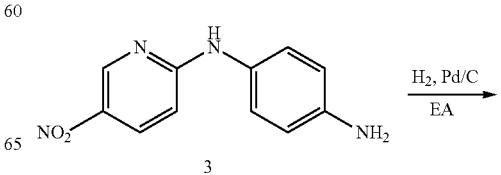

-continued

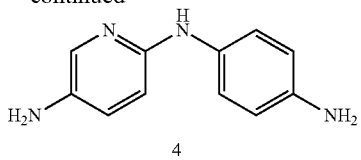

4

The compound 3 was dissolved in 200 mL of a 1:1 mixture of ethyl acetate (EA) and THF, and then 0.8 g of palladium (Pd)/carbon (C) was added thereto and stirred for 12 hours in a hydrogen atmosphere. After completion of the reaction, the reaction mixture was filtered through a Celite pad, and the filtrate was concentrated to give 11 g of a diamine of compound 4 (N-4-aminophenyl-2,5-pyridinediamine, p-IDA) (yield: 89%).

Example: Preparation of Liquid Crystal Aligning Agent Composition and Liquid Crystal Alignment Film Example 1

(1) Preparation of Liquid Crystal Aligning Agent Composition

As shown in Table 1 below, 12 g (60 mmol) of the diamine (N-4-aminophenyl-2,5-pyridinediamine) of Preparation Example 1 was dissolved in NMP, and then 16 g (57 mmol) of 3,3',4,4'-biphenyltetracarboxylic acid dianhydride was stirred at 25° C. for 4 hours to synthesize a polymer for a liquid crystal aligning agent in which a primary amino group (—NH$_2$) was bonded to the terminal. Subsequently, 0.92 g (6 mmol) of (3aR,7aS)-hexahydro-2-benzofuran-1,3-dione represented by Chemical Formula a was added as a terminal modifier, and stirred for 20 hours to prepare a liquid crystal aligning agent composition.

[Chemical Formula a]

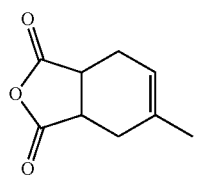

(2) Preparation of Liquid Crystal Alignment Film

The liquid crystal aligning agent composition obtained in (1) of Example 1 was coated onto a rectangular glass substrate having a size of 2.5 cm×2.7 cm, in which an ITO electrode having a thickness of 60 nm and an area of 1 cm×1 cm was patterned, by using a spin coating method. Then, the substrate coated with the liquid crystal aligning agent composition was placed on a hot plate and dried at about 80° C. for 2 minutes. Subsequently, the dried coating film was irradiated with 254 nm ultraviolet rays in an exposure amount of 0.25 J/cm$^2$ using an exposure machine to which a linear polarizer was attached, to perform alignment treatment. The alignment-treated film was calcinated (cured) in an oven at 230° C. for 15 minutes to prepare a liquid crystal alignment film having a thickness of 0.1 μm.

Example 2

A liquid crystal aligning agent composition and a liquid crystal alignment film were prepared in the same manner as in Example 1, except that 5-methyl-tetrahydroisobenzofuran-1,3-dione represented by Chemical Formula b was added instead of (3aR,7aS)-hexahydro-2-benzofuran-1,3-dione as the terminal modifier.

[Chemical Formula b]

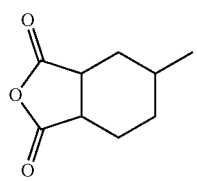

Example 3

A liquid crystal aligning agent composition and a liquid crystal alignment film were prepared in the same manner as in Example 1, except that dihydrofuran-2,5-dione represented by Chemical Formula c was added nstead of (3aR, 7aS)-hexahydro-2-benzofuran-1,3-dione as the terminal modifier.

[Chemical Formula c]

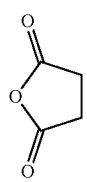

Example 4

A liquid crystal aligning agent composition and a liquid crystal alignment film were prepared in the same manner as in Example 1, except that 5-methylhexahydroisobenzofuran-1,3-dione represented by Chemical Formula d was added instead of (3aR,7aS) -hexahydro-2-benzofuran-1,3-dione as the terminal modifier.

[Chemical Formula d]

Comparative Example: Preparation of Liquid Crystal Aligning Agent Composition and Liquid Crystal Alignment Film Comparative Example 1

A liquid crystal aligning agent composition and a liquid crystal alignment film were prepared in the same manner as in Example 1, except that (3aR,7aS) -hexahydro-2-benzofuran-1,3-dione as the terminal modifier was not added.

Comparative Example 2

A liquid crystal aligning agent composition and a liquid crystal alignment film were prepared in the same manner as in Example 1, except that 5-(2,5-dioxotetrahydro-3-furanyl)-6-methylhexahydro-2-benzofuran-1,3-dione represented by Chemical Formula e was added instead of (3aR, 7aS)-hexahydro-2-benzofuran-1,3-dione as the terminal modifier.

[Chemical Formula e]

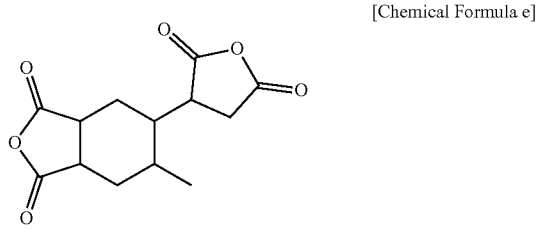 [SMILES: CC1CC2C(=O)OC(=O)C2CC1C1CC(=O)OC1=O]

Experimental Example: Measurement of Physical Properties of Liquid Crystal Aligning Agent Composition and Liquid Crystal Alignment Film Obtained in Examples and Comparative Examples The physical properties of the liquid crystal aligning agent composition or liquid crystal alignment film obtained in the examples and comparative examples, and the liquid crystal alignment cell prepared using the same, were measured by the following methods, and the results are shown in Table 1.

A specific method of preparing a liquid crystal alignment cell is as follows. The liquid crystal alignment films formed on two glass substrates respectively used as an upper plate and a lower plate other were aligned such that they faced each other, and the upper and lower plates were bonded together and then cured using a sealing agent, thereby preparing an empty cell. Then, a liquid crystal was injected into the empty cell and the injection hole was sealed, thereby preparing the liquid crystal cell.

1. AC Afterimage

Polarizing plates were attached to the upper and lower substrate plates of the liquid crystal alignment cell so as to be perpendicular to each other. The polarizing plate-attached liquid crystal alignment cell were attached on a backlight having luminance of 7000 cd/m², and the luminance in a black state was measured using a luminance or brightness measuring instrument PR-880. Then, the liquid crystal cell was operated at room temperature with an alternating voltage of 5 V for 24 hours. Thereafter, at the voltage-off state of the liquid crystal cell, luminance at the black state was measured as described above. A difference between the initial luminance (L0) measured before operation of the liquid crystal cell and the later luminance (L1) measured after operation was divided by the initial luminance (L0), and then multiplied by 100 to calculate a luminance fluctuation rate. When the calculated luminance fluctuation rate is close to 0%, it means that the alignment stability is excellent. Through the measurement results of the luminance fluctuation rate, the afterimage level was evaluated under the following criteria.

Excellent: when luminance fluctuation rate is less than 10%

Ordinary: when luminance fluctuation rate is between 10% and 20%.

2. Voltage Holding Ratio (VHR)-Long-Term Reliability

The voltage holding ratio ($V_0$) of the liquid crystal alignment cell was measured under the conditions of 1 Hz and 60° C. using 6254C equipment available from TOYO Corporation. After storing for 120 hours with the same equipment under the same conditions, the voltage holding ratio ($V_1$) was measured at 1 Hz and 60° C., and the rate of change of the voltage holding ratio was calculated according to Equation 1 to evaluate the long-term reliability.

VHR change rate (%)=initial VHR ($V_0$)−VHR after storage ($V_1$)     [Equation 1]

3. Long-Term Discoloration

After the liquid crystal aligning agent compositions of the examples and comparative examples were stored for 120 hours at room temperature (25° C.) and humidity of 40% or less, a first liquid crystal alignment film was produced by the method described in (2) of Example 1 above.

In addition, the liquid crystal aligning agent compositions of the examples and comparative examples were not stored for 120 hours at room temperature (25° C.) and humidity of 40% or less, but immediately a second liquid crystal alignment film was prepared by the method described in (2) of Example 1.

Subsequently, the transmittance of each of the first liquid crystal alignment layer and the second liquid crystal alignment layer was measured at a wavelength of 400 nm using a JASCO Asia Portal V-770 UV-VIS-NIR spectrophotometer, and the transmittance change rate was calculated through Equation 2 to evaluate the long-term discoloration.

Transmittance change rate (%)=Second liquid crystal alignment film transmittance−First liquid crystal alignment film transmittance     [Equation 2]

TABLE 1

Results of Measurement of Experimental Examples of Examples and Comparative Examples

| Category | Example 1 | Example 2 | Example 3 | Example 4 | Comparative Example 1 | Comparative Example 2 |
|---|---|---|---|---|---|---|
| Diamine | p-IDA | p-IDA | p-IDA | p-IDA | p-IDA | p-IDA |
| Terminal modifier | Formula a | Formula b | Formula c | Formula d | — | Formula e |
| AC afterimage | Excellent | Excellent | Excellent | Excellent | Excellent | Ordinary |
| VHR long-term reliability | Excellent 2.1% | Excellent 2.4% | Excellent 1.3% | Excellent 2.4% | Poor 7.2% | Poor 13.4% |
| Long-term discoloration | 0.3% | 0.7% | 0.1% | 0.1% | 3.4% | 1.1% |

* p-IDA: N-4-Aminophenyl-2,5-pyridinediamine

As shown in Table 1, in the case of the liquid crystal aligning agent compositions of the examples using Chemical Formulas a to d as a terminal modifier to be applied together with the polyimide or its precursor polymer within the liquid crystal aligning agent composition, the luminance fluctuation rate of the alignment cell obtained therefrom was less than 10%, indicating excellent alignment stability; even during long-term storage, the rate of change of VHR was low at 1.3% to 2.4%, showing excellent electrical reliability; and even during long-term storage, the rate of change of the transmittance of the alignment film was low at 0.1% to 0.7%, showing excellent reliability of the alignment film.

On the other hand, in the liquid crystal aligning agent composition of Comparative Example 1 in which no terminal modifier was contained at all, the rate of change of VHR during long-term storage was 7.2% which was very high compared with the examples, and thus the electrical reliability due to long-term storage was poor; and the rate of change of the transmittance of the alignment film during long-term storage also increased, to 3.4%, confirming that the reliability of the alignment film also decreased.

In particular, in the liquid crystal aligning agent composition of Comparative Example 2 to which the additive of the dianhydride structure was applied as shown in Chemical Formula e, the rate of change of VHR during long-term storage was 13.4%, which was much higher than that of Example 1 as well as Comparative Example 1; the electrical reliability due to the long-term storage was very poor; and the rate of change of the transmittance of the alignment film during long-term storage was 1.1%, which was increased as compared with the examples, confirming that the reliability of the alignment film also decreased.

Therefore, it is considered that not only by simply adding a terminal modifier to the liquid crystal aligning agent composition but also by adding a terminal modifier having a specific chemical structure represented by Chemical Formulas a to d, the discoloration is low even during long-term storage and thus excellent light transmittance can be exhibited when applied to a liquid crystal alignment film, and further improved alignment and electrical characteristics can be stably realized.

The invention claimed is:
1. A liquid crystal aligning agent composition comprising:
a polymer which includes one or more of a polyamic acid repeating unit, a polyamic acid ester repeating unit, and a polyimide repeating unit, and has a primary amino group bonded to at least one terminal; and
a terminal modifier compound represented by the following Chemical Formula 1,

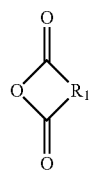

[Chemical Formula 1]

wherein, in Chemical Formula 1,
$R_1$ is either one of a linear organic functional group represented by the following Chemical Formula 2 and a cyclic organic functional group represented by the following Chemical Formula 3,

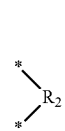

[Chemical Formula 2]

wherein, in Chemical Formula 2,
$R_2$ is any one of —O—, —CO—, —S—, —CONH—, —COO—, —O(CH$_2$)$_z$O—, —OCO—(CH$_2$)$_z$—OCO—, a substituted or unsubstituted alkylene group having 1 to 20 carbon atoms, and a substituted or unsubstituted alkenylene group having 2 to 20 carbon atoms, and Z is an integer of 1 to 10,

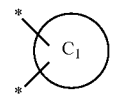

[Chemical Formula 3]

wherein, in Chemical Formula 3,
$C_1$ is any one of a substituted or unsubstituted cycloalkylene group having 3 to 20 carbon atoms, a substituted or unsubstituted arylene group having 6 to 20 carbon atoms, a substituted or unsubstituted heteroarylene group having 4 to 20 carbon atoms, and a substituted or unsubstituted cycloalkenylene group having 3 to 20 carbon atoms, wherein the polyimide repeating unit includes a repeating unit represented by the following Chemical Formula 4, the polyamic acid ester repeating unit includes a repeating unit represented by the following Chemical Formula 5, and the polyamic acid repeating unit includes a repeating unit represented by the following Chemical Formula 6:

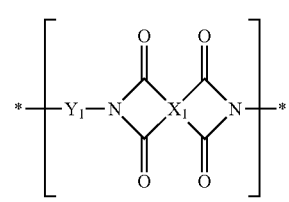

[Chemical Formula 4]

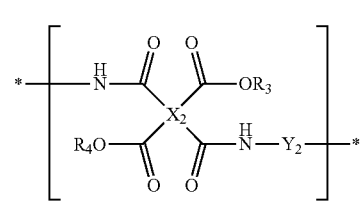

[Chemical Formula 5]

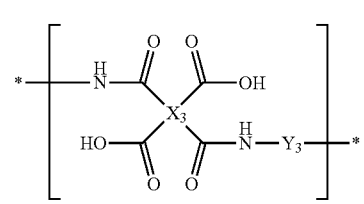

[Chemical Formula 6]

wherein, in Chemical Formulas 4 to 6,
at least one of $R_3$ and $R_4$ is an alkyl having 1 to 10 carbon atoms and the rest are hydrogen, $X_1$ to $X_3$ are the same as or different from each other, and are each independently a tetravalent organic group, $Y_1$ to $Y_3$ are each independently a divalent organic group represented by the following Chemical Formula 7-1

[Chemical Formula 7]

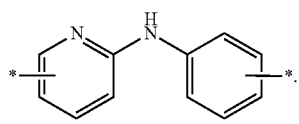

2. The liquid crystal aligning agent composition of claim 1, wherein the linear organic functional group represented by Chemical Formula 2 is any one of the functional groups represented by the following Chemical Formula 2-1:

[Chemical Formula 2-1]

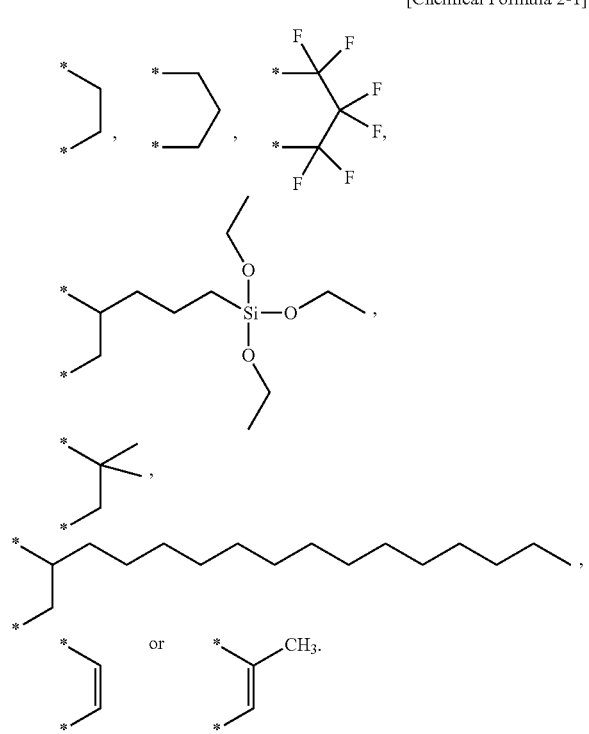

3. The liquid crystal aligning agent composition of claim 1, wherein the cyclic organic functional group represented by Chemical Formula 3 is any one of the functional groups represented by the following Chemical Formula 3-1:

[Chemical Formula 3-1]

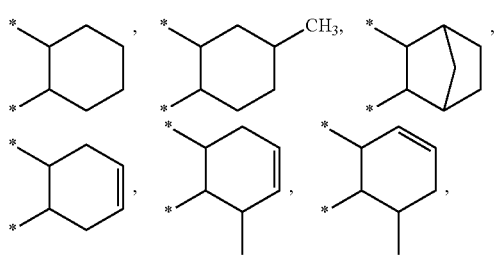

-continued

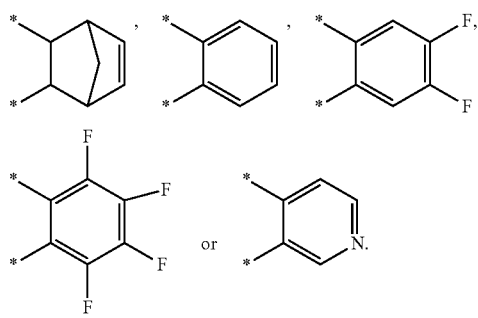

4. The liquid crystal aligning agent composition of claim 1, wherein the terminal modifier compound represented by Chemical Formula 1 is present in an amount of 0.1% by weight to 20% by weight, based on the total weight of the liquid crystal aligning agent composition.

5. The liquid crystal aligning agent composition of claim 1, wherein the terminal modifier compound represented by Chemical Formula 1 includes a compound represented by the following Chemical Formula 1-1 to a compound represented by the following Chemical Formula 1-4:

[Chemical Formula 1-1]

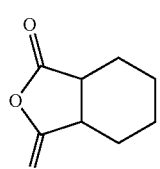

[Chemical Formula 1-2]

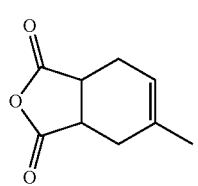

[Chemical Formula 1-3]

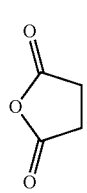

[Chemical Formula 1-4]

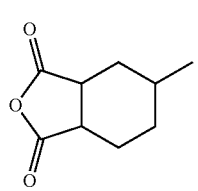

6. The liquid crystal aligning agent composition of claim 1, wherein the $X_1$ to $X_3$ are each independently any one of the tetravalent organic groups represented by the following Chemical Formula 8:

[Chemical Formula 8]

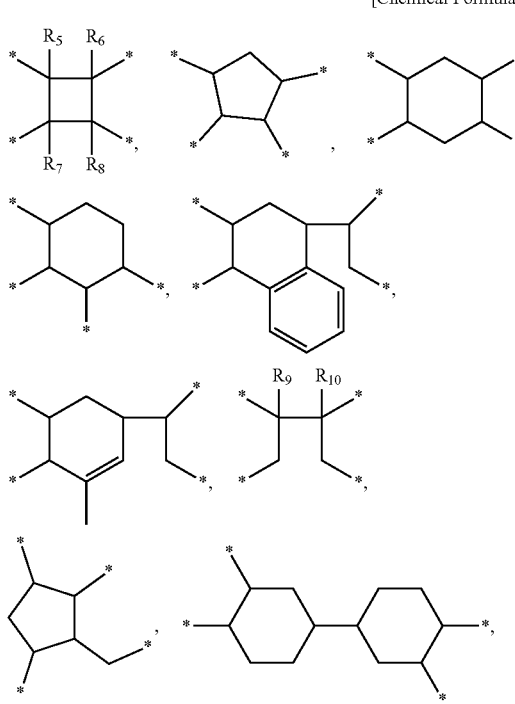

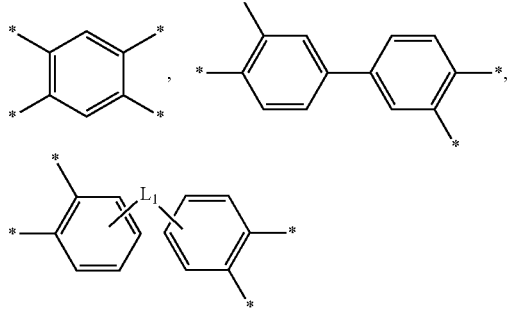

wherein, in Chemical Formula 8, $R_5$ to $R_{10}$ are each independently hydrogen, or an alkyl group having 1 to 6 carbon atoms, $L_1$ is any one of a single bond, —O—, —CO—, —COO—, —S—, —SO—, —SO$_2$—, —CR$_{11}$R$_{12}$—, —(CH$_2$)$_t$—, —O(CH$_2$)$_t$O—, —COO(CH$_2$)$_t$OCO—, —CONH—, phenylene, and a combination thereof, the $R_{11}$ and $R_{12}$ are each independently hydrogen, an alkyl group, or a haloalkyl group having 1 to 10 carbon atoms, and t is an integer of 1 to 10.

7. A liquid crystal alignment film comprising an aligned cured product of the liquid crystal aligning agent composition of claim 1.

8. A liquid crystal display device comprising the liquid crystal alignment film of claim 7.

\* \* \* \* \*